US008407072B2

(12) United States Patent
Cala et al.

(10) Patent No.: US 8,407,072 B2
(45) Date of Patent: Mar. 26, 2013

(54) PROCESS FOR MANAGEMENT OF COMPLEX PROJECTS

(75) Inventors: John Joseph Cala, Palo Alto, CA (US); Timothy Eugene Carroll, Cary, NC (US); David John Eagle, Cary, NC (US); Ronald Joseph Hofmeister, Manhattan Beach, CA (US); Laurie Jane Schaefer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1839 days.

(21) Appl. No.: 11/397,362

(22) Filed: Apr. 4, 2006

(65) Prior Publication Data

US 2007/0233545 A1 Oct. 4, 2007

(51) Int. Cl.
*G06Q 10/00* (2012.01)
*G06Q 50/00* (2012.01)
(52) U.S. Cl. ............ 705/7.11; 705/7.15; 705/7.36; 705/80; 705/311
(58) Field of Classification Search .......... 705/7.11, 705/7.15, 7.36, 1.1, 80, 311
See application file for complete search history.

(56) References Cited

U.S. PATENT DOCUMENTS

| | | | | |
|---|---|---|---|---|
| 6,571,235 B1 * | 5/2003 | Marpe et al. | ......................... | 1/1 |
| 6,581,039 B2 * | 6/2003 | Marpe et al. | ................. | 705/7.29 |
| 7,139,999 B2 * | 11/2006 | Bowman-Amuah | .......... | 717/101 |
| 7,546,246 B1 * | 6/2009 | Stamm et al. | ..................... | 705/7 |
| 2001/0028364 A1 * | 10/2001 | Fredell et al. | ................. | 345/751 |
| 2004/0249659 A1 * | 12/2004 | Schwerin-Wenzel et al. | .... | 705/1 |
| 2006/0173762 A1 * | 8/2006 | Clater | ............................ | 705/35 |
| 2006/0212327 A1 * | 9/2006 | Norman | ........................... | 705/8 |
| 2007/0156503 A1 * | 7/2007 | Ebner et al. | ....................... | 705/9 |

OTHER PUBLICATIONS

Bednarz, Ann. Software Purges Paperwork Pain. Network World; May 20, 2002; 19, 20; ProQuest Central p. 23, Retrieved Nov. 6, 2012.*
Andrew James, Luke Georghiou, and J. Stanley Metcalfe. Integrating Technology into Merger and Acquisition Decision Making. PREST, University of Manchester, M13 9PL, UK. Technovation 18 (8/9), 1998, p. 563-573, Elsevier Science Ltd.*
Legare, Thomas L. The Human Side of Mergers and Acquisitions. HR. Human Resource Planning; 1998; 21, 1; ProQuest Central p. 32, Retrieved Nov. 6, 2012.*

* cited by examiner

*Primary Examiner* — Jonathan G Sterrett
*Assistant Examiner* — Stephanie Delich
(74) *Attorney, Agent, or Firm* — Yee & Associates, P.C.; Steven L. Bennett

(57) ABSTRACT

A method for managing a complex project is provided. A plurality of phases is established for the complex project, wherein each phase of the plurality of phases has a definite duration and wherein each phase of the plurality of phases has distinct goals. The complex project is divided into a plurality of sub-projects, wherein the plurality of sub-projects is manageable by a central core team and wherein each sub-project is the responsibility of at least one team. The designation of which team is responsible for the sub-project is dependent upon the particular phase in which the sub-project is being performed.

20 Claims, 11 Drawing Sheets

| | FUNCTIONAL TEAMS STATUS REPORT 600 | | | FUNCTION | ITEM | ACTION |
|---|---|---|---|---|---|---|
| SUMMARY 602 | | | PROBLEMS 604 | LATER CLOSING COUNTRY PROCESS | FINALIZE DESIGN POINTS AND ACCOUNTING FLOWS: - AR, AP, BACK ORDER, OFFSHORE, NO PRESENCE, DAY 1 BALANCES | REMAINING OPEN ISSUES BEING REVIEWED WITH SENIOR MANAGEMENT. REVIEW SESSIONS WITH GEOS CONDUCTED THIS WEEK. FINAL WHITE PAPER TARGET 4/8 |
| WW FUNCTION | SEND AND OPERATE | CARVE-OUT | RECEIVE AND OPERATE | | | |
| ACCOUNTING | YELLOW | YELLOW | YELLOW | | | |
| IT | YELLOW | YELLOW | YELLOW | HR | TWO KEY ISSUES: (1) PAST DUE-EMPLOYMENT DOCUMENTATION AND BUSINESS CONDUCT GUIDELINES FINALIZED; (2) ESTABLISH CRITICAL STAFFING CAPABILITIES AND PROCESSES FOR NEW HIRES (NEED SELECTION OF HR EXTERNAL RECRUITING TOOLS) | WORKING TASKS WITHIN SUBTEAMS - TARGET COMPLETION 4/4 |
| HR | YELLOW | YELLOW | RED | | | |
| TAX | GREEN | GREEN | YELLOW | | | |
| TRANSFER PRICING | GREEN | GREEN | YELLOW | | | |
| OPERATING MODEL | YELLOW | YELLOW | YELLOW | | | |
| TREASURY | YELLOW | RED | RED | | | |
| ISC | YELLOW | YELLOW | YELLOW | TREASURY | TWO KEY ISSUES: (1) REVIEW AND EVALUATE CASH BALANCES AND DETERMINE NECESSARY LIQUIDITY FOR FIRST 3 MONTHS ON A COUNTRY BASIS; (2) HIRE AND TRAIN KEY STAFF IN SINGAPORE | REVIEW PROPOSAL WITH SENIOR MANAGEMENT PROGRESS BEING MADE ON HIRING. FINAL PROPOSAL TARGET 4/8 |
| PROCUREMENT | YELLOW | YELLOW | YELLOW | | | |
| MARKETING | RED | RED | RED | | | |
| SALES | YELLOW | YELLOW | YELLOW | | | |
| Ibm.com | YELLOW | YELLOW | YELLOW | | | |
| SERVICE AND SUPPORT | YELLOW | YELLOW | YELLOW | MARKETING DB | TWO KEYS ISSUES: (1) FUNDING FOR CONTRACTS; (2) DATA PRIVACY ISSUE WITH OPT IN/OUT OUT RULES | WEEKLY DEEP DIVES BEING CONDUCTED BUT NEED EXECUTIVE DECISION ON FUNDING. DATA PRIVACY ISSUES ARE BEING WORKED IN CONJUNCTION WITH OVERALL PROJECT |
| FINANCE | YELLOW | YELLOW | YELLOW | | | |
| DEVELOPMENT | YELLOW | GREEN | YELLOW | | | |
| TSA MANAGEMENT | YELLOW | YELLOW | YELLOW | | | |
| REAL ESTATE | YELLOW | YELLOW | YELLOW | | | |
| LEGAL AND IP | YELLOW | YELLOW | YELLOW | | | |
| COMMUNICATIONS | GREEN | GREEN | GREEN | MARKETING | PAST DUE: DECISION ON BRANDING GUIDELINES BY EXECUTIVE COMMITTEE | FINAL IBM DECISION ON GUIDELINES EXPECTED BY 4/8 |
| ENVIRONMENTAL | GREEN | GREEN | GREEN | | | |
| HR - LEARNING CENTER | GREEN | GREEN | YELLOW | | | |

| STATUS REPORT 400 | US | EMEA | JAPAN | AP/SOUTH | CANADA | LA | TOTAL |
|---|---|---|---|---|---|---|---|
| HR | 7 | 26 | 0 | 17 | 15 | 10 | 75 |
| TREASURY | 1 | 26 | 0 | 0 | 6 | 2 | 35 |
| ISC | 1 | 42 | 0 | 2 | 31 | 23 | 99 |
| SERVICE SUPPORT | 0 | 41 | 0 | 0 | 2 | 9 | 52 |
| GLOBAL SERVICES | 0 | 5 | 0 | 0 | 0 | 4 | 9 |
| ACCTS PAY/PROCUREMENT* | 0 | 18 | 0 | 0 | 9 | 0 | 27 |
| GLOBAL FINANCING | 0 | 8 | 0 | 0 | 2 | 9 | 19 |
| LOCAL COUNTRY/MISC | 0 | 36 | 0 | 0 | 15 | 16 | 67 |
| TOTAL | 9 | 202 | 0 | 19 | 80 | 73 | 383 |

402 SUMMARY

THERE ARE ROUGHLY 900 TOTAL FEEDER SYSTEMS.

THIS STATUS UPDATE INDICATES A REDUCTION FROM 425 IN LAST WEEK'S STATUS UPDATE. IDENTIFICATION OF FEEDER PROCESS OWNERS NOT YET COMPLETE FOR CANADA AND LA.

AP: GENERAL PROCUREMENT - FEEDERS READY IN 2Q; SHORT-TERM WORKAROUND PLAN ACKNOWLEDGED BY FINANCE.

PRODUCTION PROCUREMENT - NEW SAP PRODUCTION SYSTEM WILL BE COMPLIANT; GO LIVE ON 4/30, OPENING BALANCES AVAILABLE TO ACCOUNTING ON 4/1.

FIXED ASSETS NOT INCLUDED SINCE THEY HAVE COMMITTED TO 4/1.

PROJECT PHASES 500

| | PHASE 1: DEAL DEFINITION AND NEGOTIATION | PHASE 2: INITIAL PROJECT PLAN DEVELOPMENT | PHASE 3: DETAILED PROJECT PLAN DEVELOPMENT | PHASE 4: READINESS REVIEW PHASE | PHASE 5: READINESS SIGN-OFF PHASE | PHASE 6: POST PROJECT COMPLETION |
|---|---|---|---|---|---|---|
| BUSINESS | HIGH | HIGH | MEDIUM | LOW | LOW | LOW |
| FUNCTIONAL | MEDIUM | HIGH | HIGH | MEDIUM | LOW | LOW |
| COUNTRY/ GEOGRAPHICAL | LOW | MEDIUM | HIGH | HIGH | MEDIUM | LOW |
| PROCESS | LOW | LOW | MEDIUM | HIGH | HIGH | MEDIUM |

SIGNING AND ANNOUNCEMENT — TEAM SUMMIT — INITIAL READINESS REVIEWS — FINAL READINESS REVIEWS — FINAL EXECUTIVE SIGN-OFFS

FIG. 6

FUNCTIONAL TEAMS STATUS REPORT 600

SUMMARY 602

| WW FUNCTION | SEND AND OPERATE | CARVE-OUT | RECEIVE AND OPERATE |
|---|---|---|---|
| ACCOUNTING | YELLOW | YELLOW | YELLOW |
| IT | YELLOW | YELLOW | YELLOW |
| HR | YELLOW | YELLOW | RED |
| TAX | GREEN | GREEN | YELLOW |
| TRANSFER PRICING | GREEN | GREEN | YELLOW |
| OPERATING MODEL | YELLOW | YELLOW | YELLOW |
| TREASURY | YELLOW | RED | RED |
| ISC | YELLOW | YELLOW | YELLOW |
| PROCUREMENT | YELLOW | YELLOW | YELLOW |
| MARKETING | RED | RED | RED |
| SALES | YELLOW | YELLOW | YELLOW |
| Ibm.com | YELLOW | YELLOW | YELLOW |
| SERVICE AND SUPPORT | YELLOW | YELLOW | YELLOW |
| FINANCE | YELLOW | YELLOW | YELLOW |
| DEVELOPMENT | YELLOW | GREEN | YELLOW |
| TSA MANAGEMENT | YELLOW | YELLOW | YELLOW |
| REAL ESTATE | YELLOW | YELLOW | YELLOW |
| LEGAL AND IP | YELLOW | YELLOW | YELLOW |
| COMMUNICATIONS | GREEN | GREEN | GREEN |
| ENVIRONMENTAL | GREEN | GREEN | GREEN |
| HR - LEARNING CENTER | GREEN | GREEN | YELLOW |

PROBLEMS 604

| FUNCTION | ITEM | ACTION |
|---|---|---|
| LATER CLOSING COUNTRY PROCESS | FINALIZE DESIGN POINTS AND ACCOUNTING FLOWS: - AR, AP, BACK ORDER, OFFSHORE, NO PRESENCE, DAY 1 BALANCES | REMAINING OPEN ISSUES BEING REVIEWED WITH SENIOR MANAGEMENT. REVIEW SESSIONS WITH GEOS CONDUCTED THIS WEEK. FINAL WHITE PAPER TARGET 4/8 |
| HR | TWO KEY ISSUES: (1) PAST DUE-EMPLOYMENT DOCUMENTATION AND BUSINESS CONDUCT GUIDELINES FINALIZED; (2) ESTABLISH CRITICAL STAFFING CAPABILITIES AND PROCESSES FOR NEW HIRES (NEED SELECTION OF HR EXTERNAL RECRUITING TOOLS) | WORKING TASKS WITHIN SUBTEAMS - TARGET COMPLETION 4/4 |
| TREASURY | TWO KEY ISSUES: (1) REVIEW AND EVALUATE CASH BALANCES AND DETERMINE NECESSARY LIQUIDITY FOR FIRST 3 MONTHS ON A COUNTRY BASIS; (2) HIRE AND TRAIN KEY STAFF IN SINGAPORE | REVIEW PROPOSAL WITH SENIOR MANAGEMENT PROGRESS BEING MADE ON HIRING. FINAL PROPOSAL TARGET 4/8 |
| MARKETING DB | TWO KEYS ISSUES: (1) FUNDING FOR CONTRACTS; (2) DATA PRIVACY ISSUE WITH OPT IN/OUT OUT RULES | WEEKLY DEEP DIVES BEING CONDUCTED BUT NEED EXECUTIVE DECISION ON FUNDING. DATA PRIVACY ISSUES ARE BEING WORKED IN CONJUNCTION WITH OVERALL PROJECT |
| MARKETING | PAST DUE: DECISION ON BRANDING GUIDELINES BY EXECUTIVE COMMITTEE | FINAL IBM DECISION ON GUIDELINES EXPECTED BY 4/8 |

FIG. 8

CRITICAL PROJECTS 800

| | Establish Legal Entity | Hire and Support Employees | Pay Employees | Accounts Payable | Accounts Receivable | Generate Demand | Sell and Close | Take a Direct Order | Take a Web Order | Take a BP Order | Produce and Ship Order | Support and Service After Sales | Launch Products |
|---|---|---|---|---|---|---|---|---|---|---|---|---|---|
| | 1. ESTABLISH OPERATIONS | | | | | 2. EXECUTE SALES | | 3. EXECUTE ORDER | | | | 4. SERVICE PRODUCTS | 5. LAUNCH PRODUCTS |
| IGF | — | — | — | — | X | — | — | — | — | — | X | X | — |
| DEVELOPMENT | — | — | — | — | — | — | X | — | — | — | — | — | X |
| SERVICE/SUPPORT | — | — | — | — | — | X | — | — | — | — | X | X | X |
| MARKETING | — | — | — | — | — | X | — | — | — | — | — | — | X |
| IP | — | — | — | — | — | — | — | — | — | — | — | — | X |
| STRATEGY/ORG | — | — | — | — | — | — | — | — | — | — | — | — | — |
| ISC | — | — | — | X | X | — | X | X | X | X | X | X | X |
| COMMUNICATION | X | X | — | — | — | X | — | — | — | — | — | — | X |
| ENVIRONMENTAL | X | — | — | — | — | — | — | — | — | — | — | — | — |
| IT | — | X | X | X | X | X | X | X | X | X | X | X | X |
| ACCNT/FINANCE | X | — | X | X | X | — | — | — | — | — | X | X | X |
| WEB/CATALOGS | — | — | — | — | — | X | — | — | X | X | — | — | — |
| TREASURY | X | — | X | — | — | — | — | — | — | — | — | — | — |
| REAL ESTATE | — | X | — | — | — | — | — | — | — | — | — | — | — |
| SALES | — | — | — | — | X | X | X | X | X | X | X | — | — |
| LEGAL | X | — | — | — | — | — | — | — | — | — | — | — | — |
| HR | X | X | X | — | — | — | — | — | — | — | — | — | — |
| TAX STRUCTURE | X | — | X | — | — | — | — | — | — | — | — | — | — |

FIG. 10

CRITICAL PROJECTS STATUS REPORT 1000

| | TAX | HR | LEGAL | REAL EST | SALES F2F | SALES BP | SALES ibm.com | SALES OPS | TREAS | ACCT | WEB ibm.com | IT | COMM | ENVIRON | ISC CSO | ISC FUL/PROC | TSA MGMT | IP | MARKETING | SVS & SUP | FINANCE | IGF | PROD DEV | OVERALL PROCESS STATUS |
|---|---|---|---|---|---|---|---|---|---|---|---|---|---|---|---|---|---|---|---|---|---|---|---|---|
| ESTABLISH OPERATIONS | | | | | | | | | | | | | | | | | | | | | | | | |
| 1. ESTABLISH LEGAL ENTITY | AA | BB | CC | DD | | | | | = | = | | KK | LL | MM | NN | | PP | QQ | | | TT | UU | | ARCE |
| 2. HIRE/SUPPORT EMPLOYEES | | BB | CC | DD | | | | | = | = | | KK | LL | | | | PP | | | | TT | | | BLACK |
| 3. PAY EMPLOYEES | | BB | | | | | | HH | = | = | | KK | | | | | PP | | | | | | | CHARLES |
| 4. ACCOUNTS RECEIVABLE | AA | | CC | | EE | FF | GG | | | = | | KK | | | NN | | PP | | | | TT | UU | | DOUGLAS |
| 5. ACCOUNTS PAYABLE | AA | | CC | | | | | | | | | KK | | | | OO | PP | | | | TT | | | EDWARD |
| EXECUTE SALES | | | | | | | | | | | | | | | | | | | | | | | | |
| 6. DEMAND GEN/ENABLEMENT | | | | | EE | FF | GG | HH | | | JJ | KK | LL | | | | PP | | RR | SS | TT | UU | VV | FRANKS |
| 7. SELL AND CLOSE | | | CC | | EE | FF | GG | HH | | | JJ | | | | NN | | PP | | | | | UU | VV | GEORGE |
| EXECUTE ORDERS | | | | | | | | | | | | | | | | | | | | | | | | |
| 8. TAKE A DIRECT ORDER | | | | | EE | | GG | HH | | | | KK | | | NN | | PP | | | | | | | HUNTS |
| 9. TAKE A WEB ORDER | | | | | | | GG | HH | | | JJ | | | | NN | | PP | | | | TT | UU | | ISBELL |
| 10. TAKE A BP ORDER | | | | | | FF | | HH | | | JJ | KK | | | NN | | PP | | | | | UU | | JACKSON |
| 11. BUILD/SHIP ORDER | | | | | EE | FF | | | | | JJ | KK | | MM | NN | OO | PP | | | SS | | | | KURT |
| 12. SERVICE AND POST SALES | | | | | EE | FF | GG | HH | | = | JJ | KK | | | | OO | PP | QQ | RR | SS | TT | UU | VV | LOWES |
| 13. LAUNCH PRODUCTS | | | | DD | | | | | | | | KK | LL | MM | NN | OO | PP | QQ | RR | SS | TT | | VV | MILES |
| OVERALL FUNCTION STATUS | AA | BB | CC | | | | | | | | JJ | KK | LL | MM | NN | OO | PP | QQ | RR | SS | TT | UU | VV | NOEL |

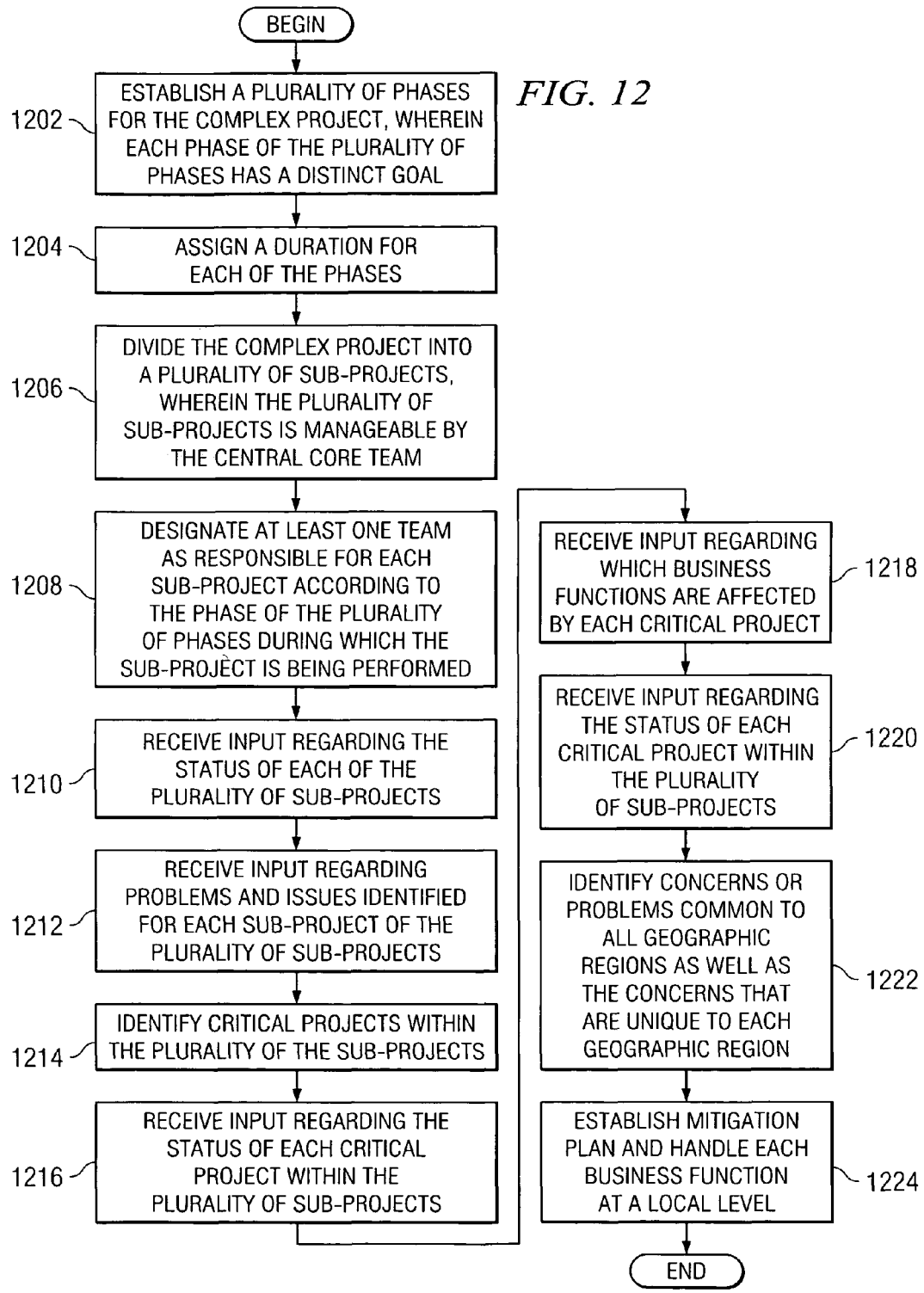

PROCESS FOR MANAGEMENT OF COMPLEX PROJECTS

BACKGROUND OF THE INVENTION

1. Field of the Invention

The present invention relates generally to a data processing system. More specifically, the present invention provides a computer implemented method, computer program product and data processing system for managing complex projects.

2. Description of the Related Art

With the advances in technology and the globalization of many industries that have occurred over recent years, companies are under ever-increasing pressure to improve their cost structure, efficiency and overall performance in a marketplace that is becoming ever more competitive. Successful companies continue to reinvent themselves all the time, but there are many situations in which a major transformational project will need to be undertaken in order to ensure that a business is to remain competitive. There is ample evidence to suggest that the speed and effectiveness of such transformation projects are extremely important factors in the future success of a company. Flawless execution of the transformation project is essential. Many challenges are involved in executing major transformational projects at the same time as operating a day-to-day business. Such projects will inevitably cut across a wide range of functional areas, and are increasingly likely to also cut across international boundaries and hence significantly widen the tax, legal, cultural and political implications of the project. Despite this complexity, the projects must be executed in a manner that is transparent to a business' customers by proactive management of the various risks.

There have been numerous publications on Project Management since the subject became a distinct discipline in the 1960s. In addition, many Universities and Business Schools offer courses on Project Management and offer certification programs as well. Despite the wealth of information and guidance in the public domain, many companies continue to struggle when executing major projects, failing on one or more of the critical axes of cost, function and schedule.

BRIEF SUMMARY OF THE INVENTION

The present invention provides a method, computer program product and system for managing a complex project. A plurality of phases is established for the complex project, wherein each phase of the plurality of phases has a definite duration and wherein each phase of the plurality of phases has distinct goals. The complex project is divided into a plurality of sub-projects, wherein the plurality of sub-projects is manageable by a central core team and wherein each sub-project is the responsibility of at least one team. The designation of which team is responsible for the sub-project is dependent upon the phase of the plurality of phases during which the sub-project is being performed.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram depicting an example of a "SWAT team" status report, in accordance with an exemplary embodiment of the present invention;

FIG. 5 is a block diagram illustrating the various phases of the complex project, and how the focus varies through time, in accordance with an exemplary embodiment of the present invention;

FIG. 6 is a pictorial representation of a rolled up summary of status reports from various functional teams, in accordance with an exemplary embodiment of the present invention;

FIG. 8 is a pictorial representation of the mapping of critical end-to-end projects and the areas that are touched by each of these projects, in accordance with an exemplary embodiment of the present invention;

FIG. 10 is a pictorial representation of a sample status report for critical projects, in accordance with an exemplary embodiment of the present invention;

FIG. 12 is a flowchart illustrating the operation of managing a complex project, in accordance with an exemplary embodiment of the present invention.

DETAILED DESCRIPTION OF THE INVENTION

Figure 1:
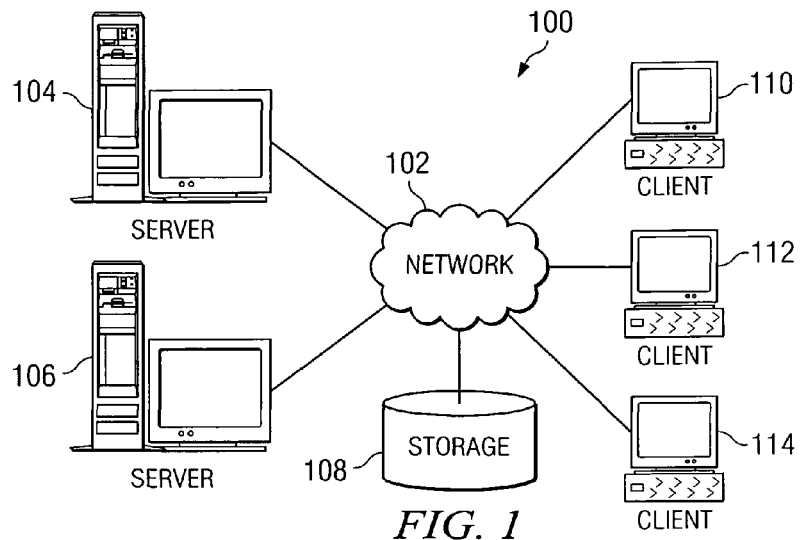
FIG. 1 is a pictorial representation of a network of data processing systems in which exemplary aspects of the present invention may be implemented.
Figure 2:
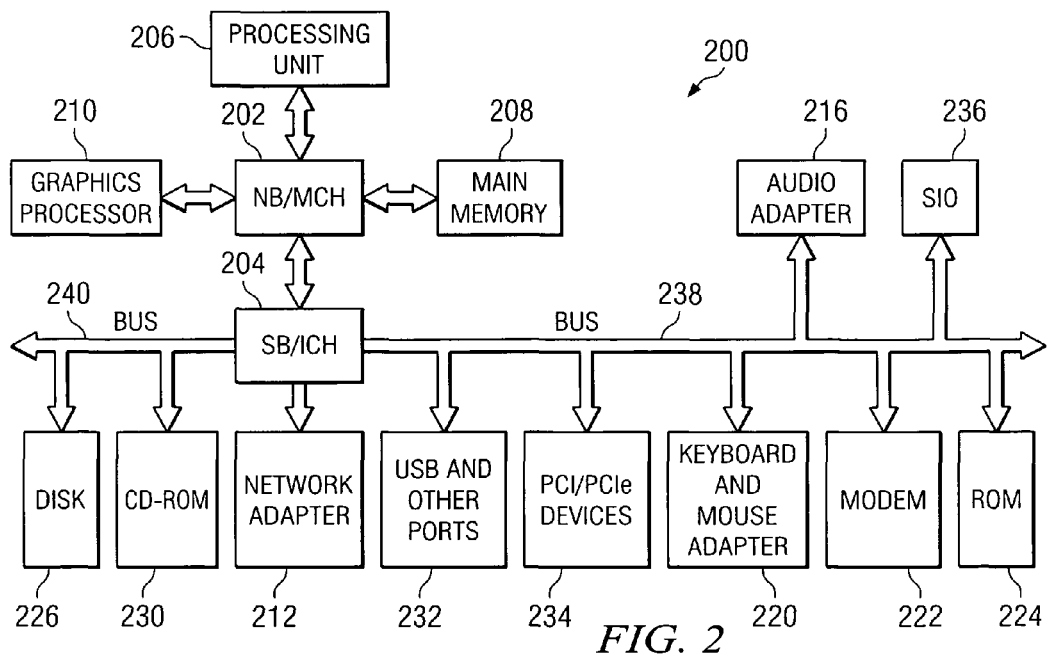
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
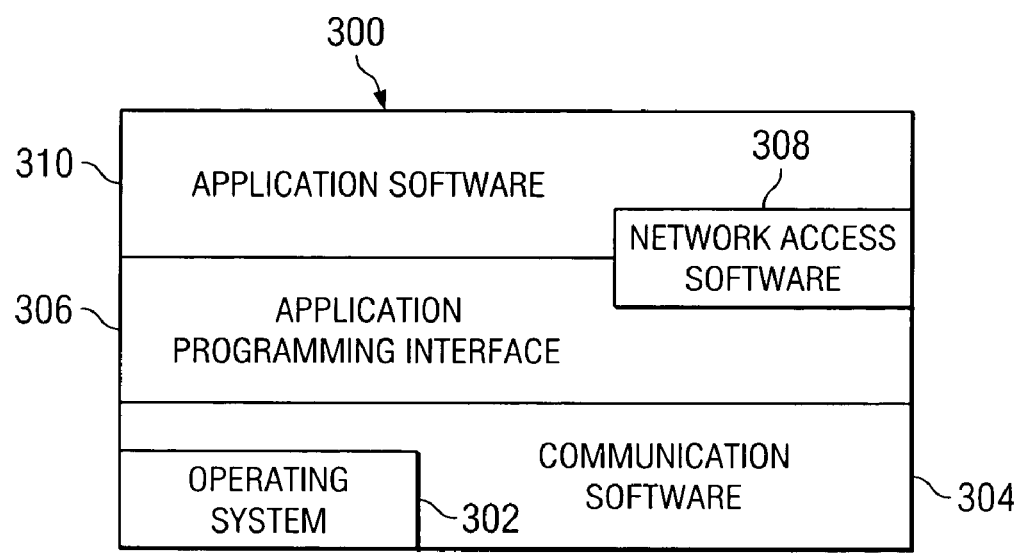
FIG. 3 is a block diagram depicting typical software architecture for a server-client system in which exemplary aspects of the present invention may be implemented.

Turning to FIG. 3, typical software architecture for a server-client system, generally denoted by reference number 300, is depicted in which exemplary aspects of the present invention may be implemented. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Application software 310 represents any number of software applications designed to react to data through the communications port to provide the desired functionality the user seeks. Applications at this level may include those necessary to handle data, video, graphics, photos or text, which can be accessed by users of the Internet.

Exemplary embodiments of the present invention describe procedures that may be employed to achieve a highly decentralized management of a wide variety of extremely complex projects that may cross functional, geographical, cultural, company and political boundaries. A complex project is any major transformational project, such as, for example, a merger, an acquisition, a restructuring, or a joint development project. A fundamental principle of the procedure is to manage the overall project with a central core team, with a particular focus on ensuring that all business control aspects are handled appropriately. A central core team is a small team of individuals, may be only six or ten individuals, who are responsible for the completion of the complex project. Additionally, the overall project should be segmented into much smaller sub-projects, each sub-project being manageable by decentralized teams. A sub-project is a part of the overall complex project, focusing on a specific area. Furthermore, the central core team needs to provide clarity of direction and clear communication of decisions. The central core team and its executives should have full ownership and accountability, and they should actively manage the risks and dependencies of the complex project. The central core team needs to drive a true "end-to-end" sub-projects focus with the decentralized teams to ensure that the smaller sub-projects all work together efficiently.

The central core team needs to manage in a highly decentralized manner in order to ensure that complex projects that are on tight schedules are completed in a timely manner. In an exemplary embodiment of the present invention, the central core team is led by a key senior executive from each company involved in the complex project. In the case where a complex project does not involve multiple companies but rather a single company, the central core team is led by key senior personnel from each department or division involved.

The central core team has several important functions. The central core team has the task of creating the high level framework, both in terms of structure and principles, on which to build all the individual elements. The central core team communicates the guiding principles to the decentralized teams in order to establish decision-making authorities and to avoid the need for multiple reviews and approvals. The central core team also provides the common tools and databases to be used for project tracking.

Furthermore, the central core team has to implement rigorous change control once a plan of record (POR) is established. The POR is the formalized plan recognized by everyone for handling the complex project.

The central core team acts as the complex project's "gearbox" and focal point, understanding all aspects of managing the various inter-team dependencies and the landscape of the complex project. The central core team manages the overall complex project by defining, managing, and tracking key project milestones. The central core team is responsible for collating and summarizing status from the individual decentralized teams, by use of common templates for input, on a strict, regular cadence. Different cadences, such as weekly, bi-weekly, monthly, and bi-monthly, for example, may be used depending upon the particular implementation.

The central core team actively manages the complex project's top high level risks by ensuring that they are fully understood and that appropriate action or mitigation plans are put in place. A mitigation plan is plan to mitigate or minimize risks and damages if a particular portion of the complex fails to operate as planned or cannot be completed in time. The central core team also keeps the transition executive team up to speed on the status of the sub-projects, engaging the help of the transition executive team and executive steering teams where required. The central core team is responsible for spotting "hotspots," that is, areas or sub-projects that need special handling and focus, and for forming "SWAT teams," which are teams specifically created to handle special or urgent problems. The central core team also manages "bottoms up" and "tops down" project issue logs during the readiness and sign-off phases. Bottoms up issues are those issues that are raised and worked on by a functional, country or process team. Tops down issues are typically those issues that have been raised by a functional, country or process team but need an executive direction or policy decision.

Thus, tops down issues are worked by the transition executive team and the executive steering teams.

Teams are established to manage specific areas of the business and to report on their status for the above-described activities. These teams, whose leaders were part of the "extended central core" team, fall into three categories: (i) functional teams, (ii) country teams, and (iii) process teams. The extended central core team refers to a team comprised of the heads of each business function from each party or company involved in the complex project. The extended central core team reports to and assists the central core team. A business function is a particular aspect, such as accounting, for example of a company. Business functions may also be referred to as departments; however, depending upon the company structure, there may be many departments that fall under on business function. For example, a business function is information technologies, but there may be several departments that address this business function, such as, for example, internal help desk, external customer support, and research.

Functional teams are created to cover all aspects of the business from Accounting, to Legal, to Manufacturing, and so forth. The teams include business controls, with particular focus on the impact of the complex project on the 51 Sarbanes-Oxley control points. Executive leads, plus sub-project managers, are assigned from all companies involved in the complex project for each function.

Country teams are rolled up at a geographic level. There should be a country team created for each country in which any company involved in the complex project conducts business. Each of the country teams is local to the country and business unit for which they were created. However, some country teams cover regions that contain several small countries. These local teams are familiar with local legal requirements and the local operating model. In addition, country teams should be created to represent those countries where no employees of the companies involved are based, but where the companies still do business. In the case where a new company is formed as a result of the complex project and none of the companies involved in the complex project do business in the country where the new company will be formed, a country team should be formed representing this country as well. Country level GMs and CFOs are identified for each country, for each company involved in the complex project.

Process teams are created to handle critical end-to-end processes that are defined across the end-to-end landscape, such as establishing operations, generating and executing sales, executing orders, servicing products and launching products. The task, or job, of getting each end-to-end processes ready by the completion date is referred to as a specific type of sub-project, an end-to-end-project.

FIG. 4 is a block diagram depicting an example of a "SWAT team" status report, generally denoted by the reference number 400, in accordance with an exemplary embodiment of the present invention. Status report 400 is an example of a report for ledger feeders that are running behind schedule. In the present case, status report 400 shows the identity and number of the ledger feeders that are not committed to be ready for the end of the complex project, split by geographic and functional area. The columns represent the geographical breakdown by country and region: the United States (U.S.), Europe and the Middle East and Africa (EMEA), Japan, Asia Pacific (AP)/ South, Canada, Latin America (LA), and the totals for each functional group. The rows represent the functional breakdown areas: Human Resources (HR), Treasury, Integrated Supply Chain (ISC), Service Support, Global Services, Accounts Payable/Procurement, Global Financing, Local Country/Miscellaneous, and a total for each geographic region. Summary 402 gives a brief summary of the important points of the report and highlights the changes from the previous edition of status report 400.

The central core team is responsible for establishing "proof points" and other metrics used to validate the progress of the complex project. The sub-projects established by the central core team should operate under a "closed loop feedback." That is, the outcome of the earlier parts of the complex project serves to modify the future plans and sub-projects of the rest of the complex project. In an exemplary embodiment of the present invention, the central core team is able to call upon additional project management support from a business consulting service and from subject matter experts from anywhere within the companies involved, wherever and whenever it is required. This flexible, on-demand resource allows the central core team to focus its time on the critical activities of the complex project.

Along with dividing the complex project into smaller sub-projects, the complex project is also divided according to a set of six phases. The phases each have a definite duration, and the transition between each phase is clearly defined. Each phase has a different focus, which helps to advance the sub-projects towards the completion of the overall, complex project.

Phase 1 is the deal definition and negotiation phase. The duration of phase 1 may vary depending upon the specific complex project. However, the duration will be as long as is necessary to complete phase 1. During this phase, negotiations are carried out between all the companies or parties involved in the complex project. The specific nature of the complex project is likely to determine the various participants in this phase. For example, a project for a merger of two companies would involve different personnel than a project for the joint development of a new technology. Regardless, the objective of phase 1 is to clearly define the scope and enable legal agreements to be drawn up that reflect the discussions. This phase is led by the business teams, with support provided by various subject matter experts, covered by a non-disclosure agreement, on an "as required" basis. In the event of a divestiture or demerger while negotiations are underway, it is important that the business simplifies itself as much as possible in order to align itself for a split. This may involve activities such as: (i) changing sourcing on certain types of product in order to simplify the split of manufacturing operations, or (ii) realigning support operations in order to minimize the amount of support that would need to be provided under a Transition Services Agreement (TSA). Such actions, suitably and timely executed, enable the overall deal to be significantly simplified. Phase 1 may also involve initiating longer-term transformations that would not be complete by the end of the complex project, but would still enhance the perceived value of the business. The end of phase 1 is marked by the signing of the contracts and the public announcement of the deal, if such an announcement is appropriate.

Phase 2 involves the initial project plan development. The duration of this phase may vary depending upon the specific complex project. For example, for a merger and acquisitions project, the duration might be set at four weeks. Following the deal signing and announcement, the various functional group and country representatives familiarize themselves with the contractual details and work on putting in place provisional sub-project plans. In particular, the various functional group and country/geographic representatives identify critical issues, critical functional dependencies, high level gating factors and a schedule for high level project milestones. Country/ geographic representatives may represent either an individual country or different regions or states within a single country. Phase 2 ends with the holding of a summit meeting at which all functional group and geographic area leaders run through all the plans, a worldwide meeting in the case of international companies being involved in the complex project. In an exemplary implementation, the summit meeting is a face-to-face meeting. However, depending upon the particular implementation, the summit meeting may be accomplished in other formats, such as a phone conference, a video conference or other appropriate means. The object of this session is the identification of any holes in the overall complex project plan and the identification of any need for any SWAT teams to be formed on specific subjects. This also marks the point at which the primary focus axis begins to shift from the functional view to the countries/geographic view.

Phase 3 involves the development of a detailed project plan. The duration of this phase may vary depending upon the specific complex project. After the summit meeting, the functional group and geographic area leaders work to identify the detailed timing requirements for the various dependencies, prioritize the closure of functional tasks, perform risk assessments and generate mitigation plans. Phase 3 is the phase during which the final, interlocked, detailed execution plans are developed, key sub-projects are identified and mapped out, and "scenario walkthroughs" are conducted. These key or critical sub-projects are concerned with various important or critical processes. The sub-project is the project, or task, of getting the process ready by the completion date.

Phase 4 is the phase during which readiness is assessed. The duration of this phase may vary depending upon the specific complex project. During this phase, using their own management system, which is based on the principles of the present invention, each functional and country team assesses its readiness to complete the complex project, including a self-assessment of their business controls position.

The companies involved should produce a flowchart for each of the critical projects that impact their various functional groups, highlighting the changes from the current state. Critical projects are those projects that most important to the successful completion of the complex project. Typically, critical projects cross various functional boundaries and therefore require a wide range of expertise and individuals to complete. At this time, the functional and country teams also present the outcomes of their "scenario walkthroughs." A scenario walkthrough is a step-by-step walkthrough of a process assuming certain input parameters; for example, a walkthrough of the order handling process where the order is to be shipped by air instead of by ground. Scenario walkthroughs verify the robustness of the new processes that are proposed. The output of the reviews is a status statement from each team, together with a list of critical actions, dependencies and mitigation plans.

In an exemplary embodiment of the present invention, the status statement is green, yellow, or red. A status statement of green indicates that there are no significant issues. A status statement of yellow indicates that there are issues, but there are plans in place to address the issues. A status statement of red indicates a situation in which no suitable solutions to the issues have been identified that enable the business objectives to be met. In another exemplary embodiment, an independent review team with a wide range of skills and experience, including business controls, is created during phase 4. The independent review team participates in each of the readiness reviews in order to provide a different perspective on the issues and to provide an assessment of overall sub-project end-to-end readiness.

Phase 5 is the readiness sign-off phase. This phase involves a second pass of reviews looking at team readiness, and the remaining open qualifications to readiness. While the duration of the phase varies with the particular complex project involved, the duration of this phase should be shorter than the previous phase. Each team is required to state its position. In an exemplary embodiment of the present invention, the status statement is either being "Ready", "Ready with Qualifications" or "Not Ready". Ideally, at this time, most teams will indicate that they are either "Ready" or "Ready with Qualifications." "Ready with Qualifications" is basically the same as a yellow status statement. The "Ready with Qualifications" statement means that the teams have achievable plans in place that enable them to be ready by the completion of the complex project, yet there are critical dependencies or actions still required. The teams identify such remaining critical dependencies, key actions and develop risk mitigation plans in case those actions cannot be completed in time.

The leaders of the various country and functional teams sign off with specific qualifications. As the leaders of these teams are typically high ranking executives, such as Vice-Presidents (VPs), General Managers (GMs), and Chief Financial Officers (CFOs), signing off with specific qualifications indicates that once those issues have been resolved then they are ready to operate. All the issues raised during phase 5 are centrally tracked to completion.

Phase 6 is the post project completion phase. The duration of this phase will vary depending upon the particular complex project. However, the duration should be set to last as long as is necessary to complete the phase. The central core team establishes a centralized Unified Command Center ("UCC") to handle any transitional issues that occurred during the completion of the complex project, no matter what the subject. Depending upon the particular implementation, the UCC may be functional for different periods of time. In an exemplary embodiment of the present invention, the UCC operates twenty-four hours a day, seven days a week. The UCC provides the various teams with a mechanism for inputting problems and having them prioritized centrally, enabling them to clearly identify the issues that are local issues and the issues that are truly global in nature. In the above-mentioned exemplary embodiment, the UCC operates as a three-shift operation, polling each functional and geographic team every six hours, tracking and centrally managing the issues, where appropriate, and issuing regular status reports to the transition executive team. The UCC is kept in place until the complex project is completed and operations have stabilized. At this point, the central core team gathers any remaining non-urgent issues and ensures that such issues are being handled within the existing, ongoing management system. The ongoing activity is handed over to an ongoing management team that will remain in place for each party involved in the complex project for a significant time in order to manage the residual aspects of the relationship.

FIG. 5 is a block diagram illustrating the various phases of the complex project, generally denoted as Project Phases 500, and how the focus varies through time, in accordance with an exemplary embodiment of the present invention. Project Phases 500 shows the six phases that the overall complex project has broken down into columns. The column headings are: Phase 1: Deal Definition and Negotiation, Phase 2: Initial Project Plan Development, Phase 3: Detailed Project Plan Development, Phase 4: Readiness Review Phase, Phase 5: Readiness Sign-off Phase, and Phase 6: Post Project Completion. The rows represent the types of teams that carry out the various sub-projects in each of the phases. The rows are titled: Business, Functional, Country/Geographical, and Process. Each cell within the row contains the priority of that row's team for that particular phase. The priorities range from High to Medium to Low. Notated at the bottom of each column is the activity that marks the transition from one phase to another phase. The first transition activity is the signing and announcement that occurs between phase 1 and phase 2. The team summit is the next transition point, the transition between phases 2 and 3. The initial readiness review marks the transition from phase 3 to phase 4. The final readiness review marks the transition from phase 4 to phase 5. The final executive sign-off marks the end of the complex project, and the transition from phase 5 to phase 6. The key observation is that as the complex project progresses, the focus shifts from the business teams, who define and strike the deal, to the functional teams that set ground rules and operating guidelines, to the country teams that apply the ground rules and operating policies to produce and implement plans based on the worldwide functional rules, and finally to the process teams, who verify end-to-end functionality. In another exemplary embodiment of the present invention, each functional or country team is further subdivided using the same basic approach.

Each business team remains fully engaged for the duration of the complex project, handling all aspects of any required negotiations or interpretation of the agreements. This serves two purposes. First, this allows the other teams to focus fully on the task at hand without needing to become experts in the legal agreements. Secondly, and perhaps more importantly, preserving the relationships between the business teams. Hence, ensuring that the "two in a box" team members are kept fully focused on operational issues rather than on financial issues. Two in a box refers to the concept of having the functional group leaders work directly with their counterpart from the other company involved to form a two person team. For example, the head of the Human Resources function from each company involved in the complex project would work together to produce one joint report on Human Resources that would provide the status and highlight any area of disagreement.

In an exemplary embodiment of the present invention, the complex project is a merger and acquisition. In such a case, for each phase, the activities are further divided into three distinct "views" of the complex project: (i) send and operate, (ii) carve out, and (iii) receive and operate. The "send and operate" view relates to the ability of the selling company to operate the remaining portions of its business after the end of the complex project. In some cases, significant reflow and affordability challenges may be faced by the company. The status is provided by the company concerned.

The second view, the "carve out" view, is concerned with separating part of the business functions from the original company. In the case of a divestiture of companies, this view refers to the portion of the business that is to be sold from the rest of business. It primarily includes identifying for carve out the detailed list of assets, liabilities and employees to be transferred, but also covers the management of any disputes or areas where the ongoing operational solution has not been agreed upon. The status is provided jointly by team members from all companies involved. In the case of a divestiture or merger, this is the area where the project teams of both companies intersect.

The third view, the "receive and operate" view, relates to ensuring that the receiving or newly formed company is able to operate the business after the complex project is over in a manner that is in line with the expectations set during the negotiation of the deal.

As mentioned previously, a large scale, complex project can only be managed in a highly decentralized manner. In this environment, establishing ownership early in the process and ensuring that there is true accountability for results is absolutely essential for the success of the complex project. One way to establish ownership and to ensure that true accountability exists is to put formal readiness sign-offs in place for the key line executives in the functions and countries. In one exemplary embodiment of the present invention, the worldwide functional group executive leader, typically a VP, the country executives, which include the country GMs and CFOs, and the sub-project owners, are required to sign off for each company involved in the complex project.

All owners that are going to be required to sign off should be notified of their responsibilities during phase 2. This ensures that the owners provide the required level of focus throughout. The owners are required to sign off that they have ensured a satisfactory business controls posture, including Sarbanes-Oxley compliance where applicable. Additionally, the owners sign off that they are convinced that their in-country execution is prepared and ready on all fronts. Furthermore, the owners must sign off that detailed cutover plans are in place, with all activities clearly defined, and that appropriate backup plans are in place to ensure operational stability and to minimize any customer impact. The final sign-off is that of the senior executive teams of each of the companies involved, who granted formal permission for the transaction to proceed following receipt of the various other sign-offs.

It should be noted that ownership and accountability is not limited to the executive levels. As described elsewhere, the key to success is segmentation of the complex project into smaller sub-projects, and that each of the team leaders for the sub-projects is also empowered and held fully accountable for results, just as their team members are. Speed of execution is critically dependent upon such segmentation and delegation of authority and responsibility, right down to the functional and country organizations.

Regarding complex projects of a large magnitude, clarity of direction and the ability to control and clearly communicate any changes are absolutely essential to successful execution. Communication is clearly the top priority at the start of phase 2, starting off with the announcement of the deal to the public and to employees, when appropriate, and then continuing with the selection and briefing of the various team members brought on board at the start of phase 2 in order to execute the complex project. One way to ensure clear communication is to have clear and consistent leadership provided at all times, including the consistency of message and of the individuals involved. Additionally, a summary of the deal, laying out, at a high level, the goal of the complex project, such as what is being sold or developed, the current view of the assets, the people/personnel implications, and the proposed schedule should be proposed.

Each contract involved is summarized by the relevant lawyers and is distributed, as appropriate, to the teams. The summit meeting held at the end of phase 2 provides a key forum for communication. Various types of frameworks associated with the complex project are clearly explained. Some examples of frameworks include, but are not limited to, the legal structure in each country, the holding company structure, the business model for each country, financial flows, HR guidelines, and legal requirements.

Extended central core team meetings are held on a regular basis. All functional group, geographic area, process teams and business unit representatives attend this meeting. Each area provides input for this meeting in a consistent format. Central core team interlocks are held several times per week between representatives of all the companies involved in the complex project. An interlock is a meeting with the express purpose of making sure that each company or party involved in the complex project understands the issues and concerns of the other party, allowing them to jointly develop plans to address these concerns. Executive Steering Committee meetings are held by the transition executive team to update the senior executives and to ask for assistance where required. Use of a common set of base charts in these meetings ensures a very efficient management system between the executive teams.

In an exemplary embodiment of the present invention, a banner-headed newsletter is used as the formal vehicle for communicating any changes to the plan of record, issue resolution, details of policies to be adopted, etc. The banner-headed newsletter is issued on an "as required" basis to all team members and provides for a rapid, consistent, formal means of communication. In another exemplary embodiment of the present invention, "scorecards" are used extensively for status reporting on all aspects of the complex project. Using a "traffic light" color coding allows for rapid visual identification of the issues.

Clear and consistent use of metrics to track project progress provides for clear communications among all parties involved. As the complex project approaches various critical checkpoints, the intensity of the management system is increased by initiating daily open phone line sessions where any team lead could raise any issue or ask for clarification on a particular aspect. Twenty-four hour, seven days a week access to the central core team is granted for the various team leaders. Daily briefings are sent to the senior executive teams on the top issues, as well as the outlooks for resolution of existing and potential problems. An operations or "deal" command center, focusing on any business issues is created. Furthermore, during the "go live" transition, the UCC publishes status updates for all the teams several times per day, until the operations are stabilized.

Clear communication ensures that the teams engaged on the complex project are always "pulling in the same direction" and that the teams rarely become idle while waiting for a decision to be made or communicated.

It should be noted that in the midst of so much change, it may be desirable to leave some aspects unchanged during the complex project. One of the most important aspects is company culture. Changing culture is a long-term objective, not a short-term one. Keeping culture as a constant may be a key contributor to ensuring the effectiveness of communication.

Breaking the complex project into small sub-projects creates a risk that the sub-projects will not function end-to-end due to potential disconnects in the detailed assumptions made by the various teams. This risk is mitigated by taking various actions. For example, the role of the central core team as the "gearbox" and focal point of the complex project ensures that it plays a key part in ensuring end-to-end effectiveness by understanding the landscape and proactively managing the risks. Additionally, process and business scenario walk-throughs are conducted within each country for each major sub-project, covering operations, IT and business controls. Identifying owners for the key end-to-end projects, and requiring them to sign-off on their readiness as part of the overall review process, helps to mitigate the risk. Another way to mitigate the risk is to require country GMs and CFOs to sign-off that the sub-projects have been completed to their satisfaction and that the processes underlying the sub-projects will operate in their respective country, meeting all customer and business control requirements.

Independent review teams engage in all readiness reviews. These teams are extremely experienced and have expert knowledge of the various end-to-end sub-projects, including experience with business controls and previous similar complex projects. Establishing appropriate metrics and proof points in order to closely monitor end-to-end effectiveness once the complex project is completed helps to mitigate the risk as well.

In an exemplary embodiment of the present invention, the business units of each company involved in the complex project have teams in place specifically to ensure that their part of the business will operate properly once the complex project is complete. These teams verify the end-to-end functionality for their own portions of the landscape.

FIGS. 6-10 describe an illustrative embodiment of the present invention, wherein the complex project is a merger and acquisition project. As such, the figures are described using the exemplary embodiment of the three views. However, the examples are not meant, in any way, to limit the application of the present invention to other complex projects such as, for example, a joint venture project, a joint product development project, or creating a spin-off company.

FIG. 6 is a pictorial representation of a rolled up summary of status reports from various functional teams, in accordance with an exemplary embodiment of the present invention. Functional Teams Status Report 600 is an example of a rolled up summary of status reports from various functional teams that is published on a weekly basis. Functional Teams Status Report 600 comprises Summary 602, which highlights the status for each of the three views in a merger and acquisition project for each function, and Problems 604, which highlights the top issues raised by the functional teams and the corresponding actions to be taken. The four column titles of Summary 602 are WW (worldwide) Function, Send & Operate, Carve-Out, and Receive & Operate. The WW Function column of Summary 602 contains the names of all the various worldwide functions, one function per cell. Each cell of the other three columns of Summary 602, Send & Operate, Carve-Out, and Receive & Operate, shows the level of readiness for each function for that particular view. All of the statuses that show "red" are included and more fully explained in Problems 604. In the case where the complex project is not a merger and acquisition, and multiple views are not used, Summary 602 would only contain two columns: (i) WW Function, and (ii) Status.

Problems 604 comprises three columns. The titles of the columns are: Function, Item, and Action. The Function column lists the function that is experiencing a problem. The Item column contains a summary of all the troubled areas experienced by the function listed in the Function column. The Action column contains a summary of the action to be taken to mitigate or correct the problem listed in the Item column.

Figure 7:
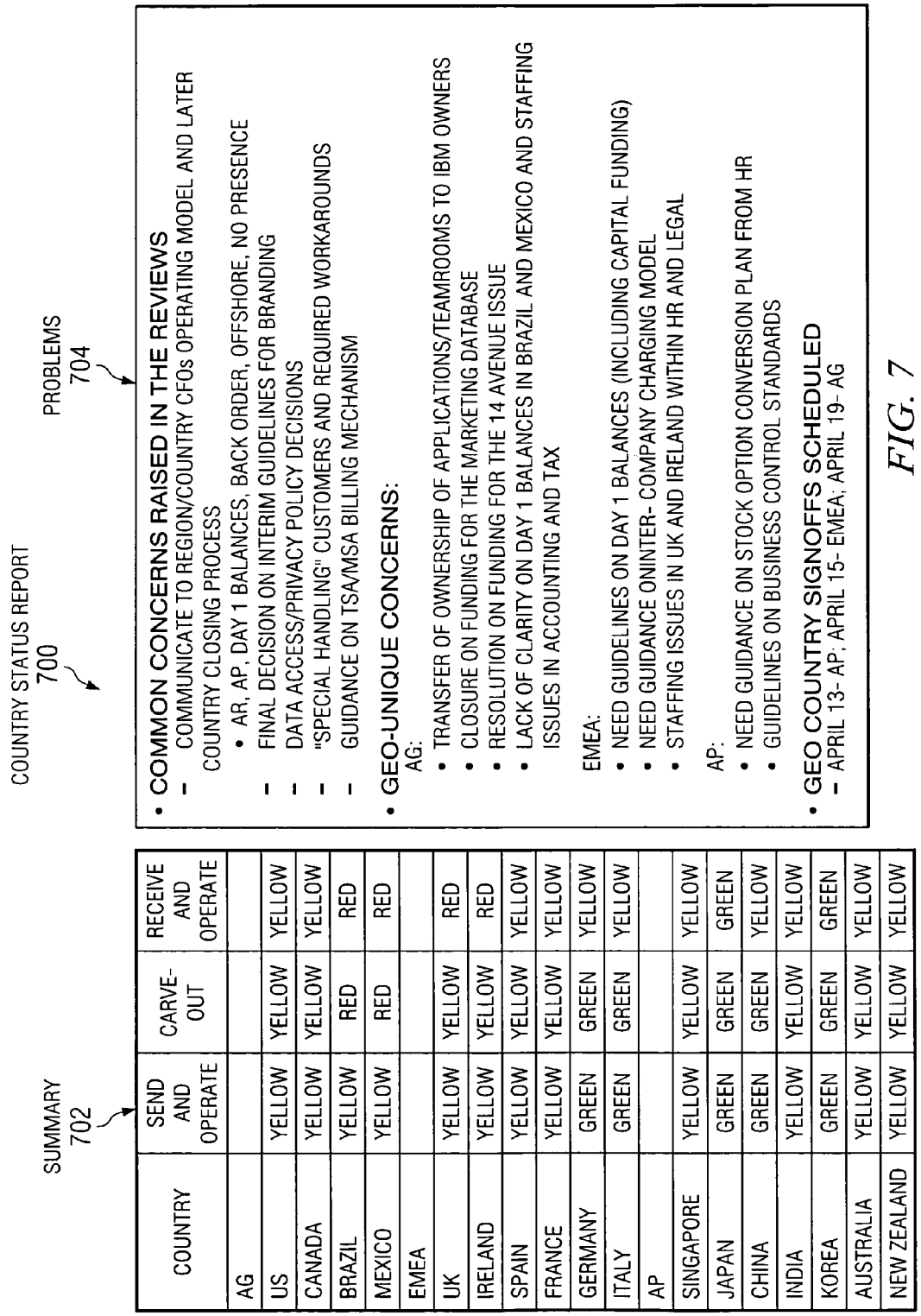
FIG. 7 is a pictorial representation of a rolled up summary of status reports from various country teams, in accordance with an exemplary embodiment of the present invention.

FIG. 7 is a pictorial representation of a rolled up summary of status reports from various country teams, in accordance with an exemplary embodiment of the present invention. Country Status Report 700 is an example of a rolled up summary of status reports from various country teams that is published on a weekly basis. Country Status Report 700 shows how common worldwide issues may be highlighted. Country Status Report 700 also points out the geo-unique concerns that may exist in any sub-project. Country Status Report 700 comprises Summary 702, which highlights the status for each of the three views in a merger and acquisition project for each country, and Problems 704, which highlights the common issues raised by the country teams as well as the geo-unique concerns raised by individual country teams. The four column titles of Summary 702 are Country, Send & Operate, Carve-Out, and Receive & Operate. The Country column of Summary 702 contains the names of all the various Countries, grouped by region, one country per cell. The regions are the Americas group (AG), Europe, the Middle East and Africa (EMEA), and Asia Pacific (AP). The countries belonging to each region are listed alphabetically under each region. Each cell of the other three columns of Summary 702, Send & Operate, Carve-Out, and Receive & Operate, shows the level of readiness for each country for that particular view. In the case where the complex project is not a merger and acquisition and multiple views are not used, Summary 702 would only contain two columns, Country and Status.

Problems 704 comprises three areas. The titles of the three areas are: Common concerns raised in the reviews, Geo-unique concerns, and Geo country sign-offs scheduled. The Common concerns raised in the reviews section lists concerns or problems that are common to all the countries. The Geo-unique concerns area contains a summary of all the problems faced by the individual countries or regions, grouped by region. The Geo country sign-offs scheduled is a listing of the sign-off dates broken down by region.

FIG. 8 is a pictorial representation of the mapping of critical end-to-end projects and the areas that are touched by each of these critical end-to-end projects, in accordance with an exemplary embodiment of the present invention. Critical Projects 800 contains a list of all the critical processes necessary to complete the complex project. The task, or job, of getting each critical process ready by the completion date is referred to as a specific type of sub-project, a critical project. For the purposes of illustration, Critical Projects 800 lists five critical processes, each of which is further broken down into component critical processes. The five identified critical processes are: Establish Operations, Execute Sales, Execute Order, Service Products, and Launch Products. The Establish Operations critical process is further divided into the critical processes of: Establish Legal Entity, Hire and Support Employees, Pay Employees, Accounts Payable, and Accounts Receivable. The Execute Sales critical process is further broken down into the critical processes of: Generate Demand, and Sell and Close. The Execute Order critical process is further broken down into the critical processes of: Take a Direct Order, Take a Web Order, Take a Business Partner Order, and Produce and Ship Order. The Service Products critical process has a component critical process of Support and Service After Sales. The number and names of the critical processes will vary depending upon the particular complex project undertaken and the companies involved in the complex project.

Each of these critical processes forms a row with eighteen entries, or columns. The column headings are the titles of the various functional groups within the company. Therefore, the number and titles of the column headings will vary with the particular implementation. For each critical process, an entry is made in each column indicating whether that particular function is involved in the critical process. For example, the Establish Legal Entity critical process has X's in the Tax Structure, HR, Legal, Treasury, Accounting/Finance, Environmental, and Communication functions columns, indicating that those functions are involved in the critical process of establishing a legal entity.

Figure 9:
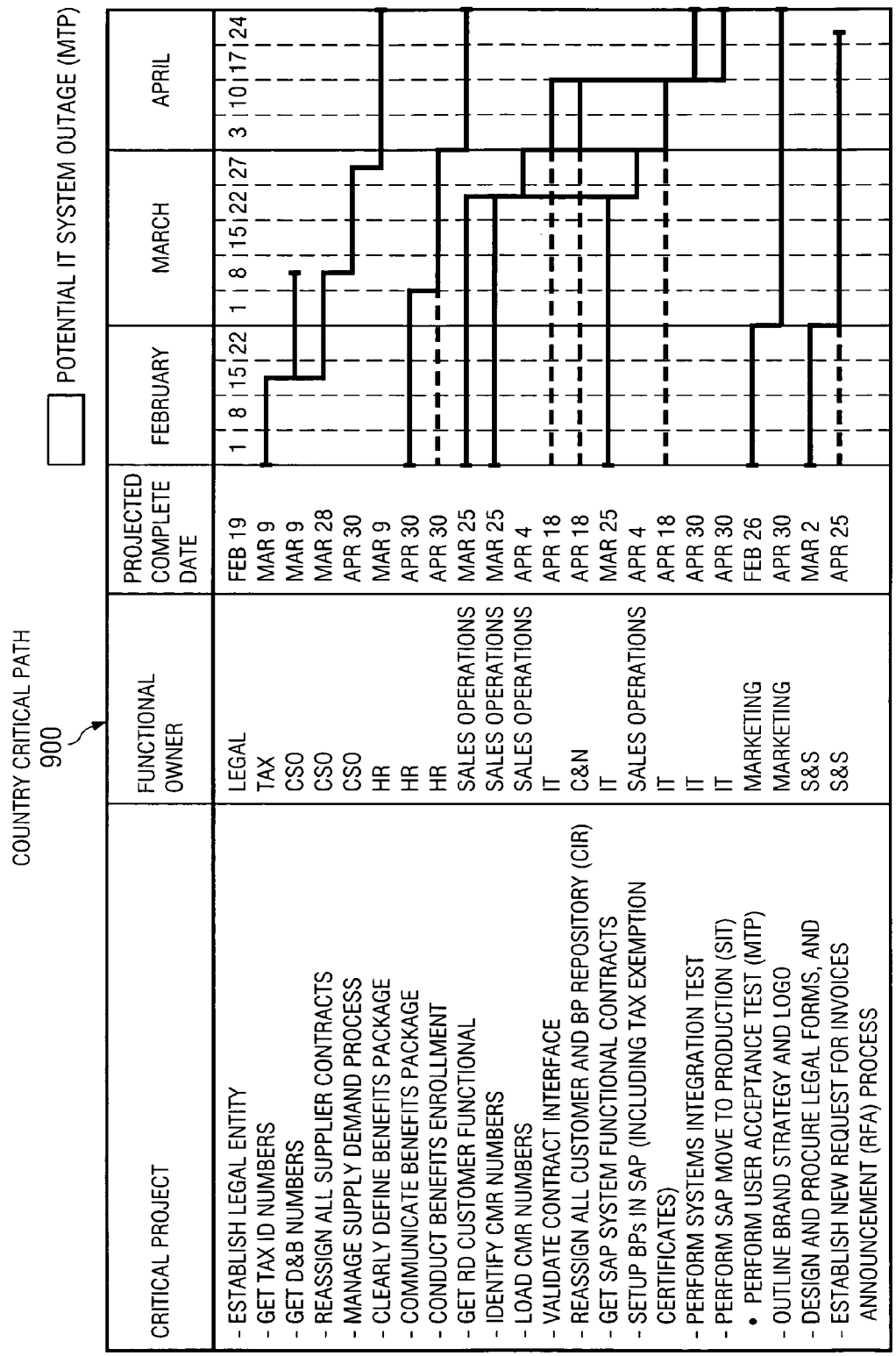
FIG. 9 is a pictorial representation of an example of a critical path developed for a particular country, in accordance with an exemplary embodiment of the present invention.

FIG. 9 is a pictorial representation of an example of a critical path developed for a particular country, in accordance with an exemplary embodiment of the present invention. Country Critical Path 900 further breaks down the various critical processes, such as those shown in FIG. 8, into individual critical tasks. Each critical task is associated with a field that shows the functional group that is assigned to complete the critical task. Each critical task is also given a projected completion date. A brief calendar is also provided showing the progress of the tasks involved and a path showing how the tasks are related. This helps to highlight key dependencies and tasks that are on the critical path for the overall complex project, allowing alternative plans and mitigation plans to be put into place, as appropriate.

FIG. 10 is a pictorial representation of a sample status report for critical projects, in accordance with an exemplary embodiment of the present invention. Critical Project Status Report 1000 comprises a list of the critical projects and the functional groups of the companies involved in the complex project. In the present example, thirteen critical projects and twenty-three functional groups have been identified. Each critical project has its own row. Additionally, there is a row for the "Overall Function Status". Each functional group has its own column. Plus, there is a column entitled "Overall Project Status". These columns and rows are put together to form a matrix. Each cell of the matrix contains a set of initials representing the individual who is responsible for that piece of the sub-project being brought to a ready, or green, status. The absence of initials in a particular cell indicates that the particular functional group of the column in question is not involved in the critical project of the row in question. The Overall Function Status row contains the name or initials of the individual in charge of making sure the functional group itself is brought to a ready status. The Overall Project Status column contains the name or initials of the individual in charge of making sure the overall critical project is brought to a ready status.

In an exemplary embodiment of the present invention, the cells of the matrix also indicate the current status of that piece of the sub-project. If the initials appear to be in normal font, as illustrated by element 1002, then the status is green, or ready. If the initials are in a bold font, as illustrated by element 1004, then the status is yellow. If the initials are in bold and the cell is highlighted, as illustrated by element 1006, then the status is red. Of course, one skilled in the art will recognize that there are many ways that status can be indicated, and the example above is only given for the purpose of explanation and is not meant in any way to limit the scope of the invention.

Figure 11:
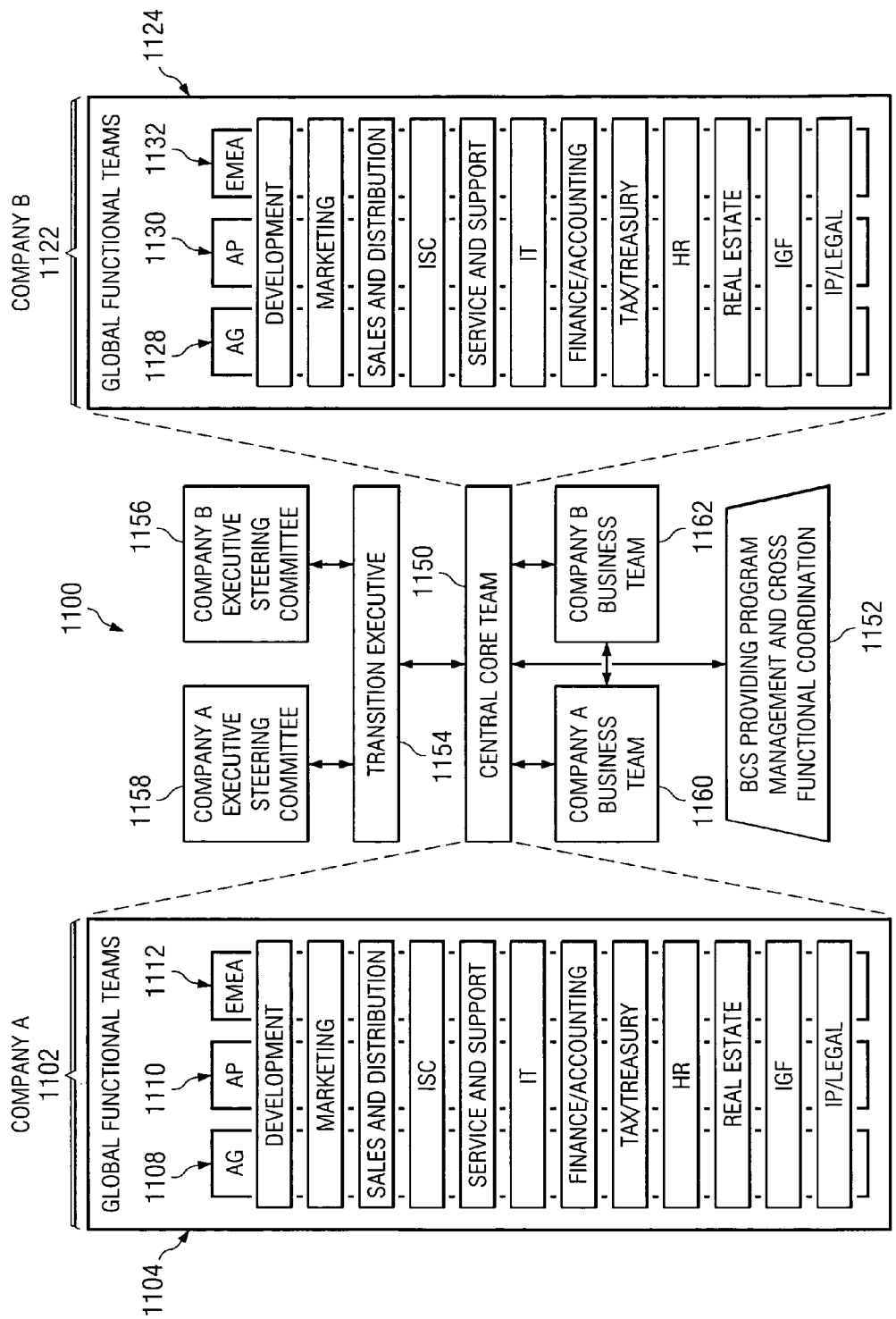
FIG. 11 is a block diagram showing the interaction and roles of the various teams, in accordance with an exemplary embodiment of the present invention.

FIG. 11 is a block diagram showing the interaction and roles of the various teams and is generally denoted by reference number 1100, in accordance with an exemplary embodiment of the present invention. Central core team 1150 is the central touchstone for all the other teams. Company A 1102 comprises global functional teams 1104 and country teams AG 1108, AP 1110, and EMEA 1112. Examples of individual functional groups are shown, including Development, Marketing, and HR among others. Country teams AG 1108, AP 1110, and EMEA 1112 are shown superimposed over global functional teams 1104, as all the functions exist in each country or geographic region. All the various teams of Company A 1102 report to Central core team 1150. Company B 1122 mirrors Company A 1102 in terms of possessing global functional teams 1124, with examples of individual functional groups shown. Country teams AG 1128, AP 1130, and EMEA 1132 are shown superimposed over global functional teams 1124, as all the functions exist in each country or geographic region. All the various teams of Company B 1122 report to Central core team 1150. Central core team 1150 may call on BCS 1152 as needed for assistance in management of certain projects and cross functional coordination. BCS 1152 is a business consulting service that provides program management and cross-functional coordination. Central core team 1150 may also call upon the help of teams not explicitly depicted in system 1100, the extended central core team. The extended central core team would consist of the leaders from both the Company A 1102 and the Company B 1122 individual Global Functional Teams 1104 and 1124. Additionally, other business units and groups not shown in this example implementation may be included in another implementation and would give input and assistance to Central core team 1150.

In the case where the project is a merger and acquisition project, Central core team 1150 meets with Transition Executive 1154 to apprise them of the current status of the various projects. Transition Executive 1154 typically comprises a transition executive from each of Company A 1102 and Company B 1122. The transition executive of Transition Executive 1154 for Company B 1122 meets with Company B Executive Steering Committee 1156 and the transition executive of Transition Executive 1154 for Company A 1102 meets with Company A Executive Steering Committee 1158, preferably on a weekly basis, to apprise them of the current status of the various projects. These steering committees set high-level policies for their respective companies. Company A and Company B Business teams 1160 and 1162 meet with Central core team 1150 and with each other. Company A and Company B Business teams 1160 and 1162 help to resolve any disagreements between the other various teams and typically negotiate with each other to reach an agreement on the issue at hand. The decision is forwarded on to Central core team 1150, which then forwards the decision to the appropriate groups with Company A 1102 and Company B 1122.

FIG. 12 is a flowchart illustrating the operation of managing a complex project, in accordance with an exemplary embodiment of the present invention. The operation begins by establishing a plurality of phases for the complex project, wherein each phase of the plurality of phases has a distinct goal (step 1202). The operation assigns a duration for each of the phases (step 1204), and divides the complex project into a plurality of sub-projects, wherein the plurality of sub-projects is manageable by the central core team (step 1206). The operation then designates at least one team as responsible for each sub-project according to the phase of the plurality of phases during which the sub-project is being performed (step 1208), and receives input regarding the status of each of the plurality of sub-projects (step 1210). In an exemplary implementation, the input regarding the status of each of the plurality of sub-projects is generated by a team comprising executive counterparts from each party involved. An executive is responsible for the status of each sub-project of the plurality of sub-projects. Then the operation receives input regarding problems and issues identified for each sub-project of the plurality of sub-projects (step 1212). The operation identifies critical projects within the plurality of sub-projects (step 1214), and receives input regarding the status of each critical project within the plurality of sub-projects (step 1216). An executive is responsible for the status of each critical project out of the plurality of sub-projects.

The operation receives input regarding which business functions are affected by each critical project out of the plurality of sub-projects (step 1218). Functional teams are responsible for supplying this input. The operation receives input regarding the status of each of the business functions in relation to each critical project within the plurality of sub-projects (step 1220). In an exemplary implementation, an executive is responsible for the status of each of the business functions in relation to each critical project within the plurality of sub-projects. Next, the operation identifies concerns or problems common to all geographic regions as well as the concerns that are unique to each geographic region (step 1222), and subsequently establishes mitigation plans and handles each business function at a local level (step 1224) and the operation ends.

Thus, exemplary embodiments of the present invention provide a method for managing complex projects.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a complex merger and acquisition project, the computer implemented method comprising:
   a memory having a plurality of software instructions stored therein, the plurality of software instructions adapted to cause a processor of a computer to perform the steps of:
   establishing a plurality of phases of the complex merger and acquisition project, wherein each phase of the plurality of phases has a definite duration and wherein each phase of the plurality of phases has distinct goals;
   establishing a sending company and a receiving company for the complex merger and acquisition project;
   dividing the complex merger and acquisition project into a plurality of sub-projects, wherein the plurality of sub-projects is manageable by a central core team and wherein each sub-project is the responsibility of at least one team; and
   designating each at least one team responsible for each sub-project according to the phase of the plurality of phases during which the sub-project is being performed; and
   configuring three distinct views for each phase of the plurality of phases of the complex merger and acquisition project, wherein the three distinct views comprise a send and operate view, a carve out view, and a receive and operate view; and
   determining the sending company's send and operate status by collecting operational data for operating the remaining portions of its business after the end of the complex merger and acquisition project; and
   configuring the send and operate view with a status summarizing the sending company's send and operate status; and
   configuring the carve out view by combining carve out status collected from a first project team associated with the sending company and a second project team associated with the receiving company, wherein the carve out status collected includes a list of assets, liabilities and employees to be transferred in the complex merger and acquisition project, and a status of disputes between the sending company and the receiving company participating in the complex merger and acquisition project; and
   determining the receiving company's receive and operate status by collecting operational data for operating the portions of the business being received from the sending company after the end of the complex merger and acquisition project; and
   configuring the receive and operate view with a status summarizing the receiving company's receive and operate status.

2. The computer implemented method of claim 1, wherein the plurality of phases comprises six phases.

3. The computer implemented method of claim 2, wherein the six phases comprise phase 1, phase 2, phase 3, phase 4, phase 5, and phase 6, and wherein business teams are designated as being responsible for sub-projects being performed in phase 1 and wherein business teams and functional teams are designated as responsible for sub-projects being performed in phase 2 and wherein functional teams and country teams are designated as responsible for sub-projects being performed in phase 3 and wherein country teams and process teams are designated as responsible for sub-projects being performed in phase 4 and wherein process teams are designated as responsible for sub-projects being performed in phase 5 and wherein the central core team is designated as responsible for the sub-projects being performed during phase 6.

4. The computer implemented method of claim 1, further comprising:
receiving input regarding the status of each of the plurality of sub-projects.

5. The computer implemented method of claim 4, wherein the input regarding the status of each of the plurality of sub-projects is generated by a team comprising executive counterparts from the sending company and the receiving company participating in the complex merger and acquisition project.

6. The computer implemented method of claim 4, wherein an executive is designated as being responsible for the status of each sub-project of the plurality of sub-projects.

7. The computer implemented method of claim 1, further comprising:
identifying critical projects within the plurality of sub-projects; and
receiving input regarding the status of each critical project within the plurality of sub-projects.

8. The computer implemented method of claim 7, wherein an executive is designated as being responsible for the status of each critical project within the plurality of sub-projects.

9. The computer implemented method of claim 7, wherein functional teams determine which business functions are affected by each critical project within the plurality of sub-projects.

10. The computer implemented method of claim 9, further comprising:
receiving input regarding the status of each of the business functions in relation to each critical project within the plurality of sub-projects.

11. The computer implemented method of claim 10, wherein an executive is designated as being responsible for the status of each of the business functions in relation to each critical project within the plurality of sub-projects.

12. The computer implemented method of claim 9, wherein country teams identify concerns common to all geographic regions and concerns unique to each geographic region, for each business function affected by each critical project within the plurality of sub-projects.

13. The computer implemented method of claim 12, wherein process teams establish mitigation plans and handle each business function affected by each critical project within the plurality of sub-projects at a local level.

14. The computer implemented method of claim 1, further comprising:
receiving input regarding problems and issues identified for each of the sub-projects of the plurality of sub-projects.

15. The computer implemented method of claim 14, wherein the input regarding problems and issues identified for each of the sub-projects of the plurality of sub-projects comprises input from the central core team, functional teams, country teams, and process teams regarding problems and issues identified for each of the sub-projects of the plurality of sub-projects.

16. The computer implemented method of claim 14, wherein a business team exclusively handles all negotiations between the sending company and the receiving company participating in the complex merger and acquisition project.

17. A computer program product in a computer readable storage medium for managing a complex merger and acquisition project, the computer program product comprising:
computer usable program code stored in the computer readable storage medium, wherein the computer usable program code is adapted to cause a processor in a computer to perform steps comprising:
establishing a plurality of phases of the complex merger and acquisition project, wherein each phase of the plurality of phases has a definite duration and wherein each phase of the plurality of phases has distinct goals;
establishing a sending company and a receiving company for the complex merger and acquisition project;
dividing the complex merger and acquisition project into a plurality of sub-projects, wherein the plurality of sub-projects are manageable by a core team and wherein each sub-project is the responsibility of at least one team; and
designating each at least one team responsible for each sub-project according to the phase of the plurality of phases during which the sub-project is being performed; and
configuring three distinct views for each phase of the plurality of phases of the complex merger and acquisition project, wherein the three distinct views comprise a send and operate view, a carve out view, and a receive and operate view; and
determining the sending company's send and operate status by collecting operational data for operating the remaining portions of its business after the end of the complex merger and acquisition project; and
configuring the send and operate view with a status summarizing the sending company's send and operate status; and
configuring the carve out view by combining carve out status collected from a first project team associated with the sending company and a second project team associated with the receiving company, wherein the carve out status collected includes a list of assets, liabilities and employees to be transferred in the complex merger and acquisition project, and a status of disputes between the sending company and the receiving company participating in the complex merger and acquisition project; and
determining the receiving company's receive and operate status by collecting operational data for operating the portions of the business being received from the sending company after the end of the complex merger and acquisition project; and
configuring the receive and operate view with a status summarizing the receiving company's receive and operate status.

18. The computer program product of claim 17, wherein the plurality of phases comprises six phases.

19. The computer program product of claim 18, wherein the six phases comprise phase 1, phase 2, phase 3, phase 4, phase 5, and phase 6, and wherein business teams are designated as being responsible for sub-projects being performed in phase 1 and wherein business teams and functional teams are designated as responsible for sub-projects being performed in phase 2 and wherein functional teams and country teams are designated as responsible for sub-projects being performed in phase 3 and wherein country teams and process teams are designated as responsible for sub-projects being performed in phase 4 and wherein process teams are designated as responsible for sub-projects being performed in phase 5 and wherein the core team is designated as responsible for the sub-projects being performed during phase 6.

20. A data processing system for managing a complex merger and acquisition project, the data processing system comprising:
- a storage device, wherein the storage device stores computer usable program code; and
- a processor, wherein the processor executes the computer usable program code to establish a plurality of phases of the complex merger and acquisition project, wherein each phase of the plurality of phases has a definite duration and wherein each phase of the plurality of phases has distinct goals; establish a sending company and a receiving company for the complex merger and acquisition project; divide the complex merger and acquisition project into a plurality of sub-projects, wherein the plurality of sub-projects project is manageable by a core team and wherein each sub-project is the responsibility of at least one team; and designate each at least one team responsible for each sub-project according to the phase of the plurality of phases during which the sub-project is being performed; and
- configure three distinct views for each phase of the plurality of phases of the complex merger and acquisition project, wherein the three distinct views comprise a send and operate view, a carve out view, and a receive and operate view; and
- determine the sending company's send and operate status by collecting operational data for operating the remaining portions of its business after the end of the complex merger and acquisition project; and
- configure the send and operate view with a status summarizing the sending company's send and operate status; and
- configure the carve out view by combining carve out status collected from a first project team associated with the sending company and a second project team associated with the receiving company, wherein the carve out status collected includes a list of assets, liabilities and employees to be transferred in the complex merger and acquisition project, and a status of disputes between the sending company and the receiving company participating in the complex merger and acquisition project; and
- determine the receiving company's receive and operate status by collecting operational data for operating the portions of the business being received from the sending company after the end of the complex merger and acquisition project; and
- configure the receive and operate view with a status summarizing the receiving company's receive and operate status.

* * * * *